Jan. 21, 1964 A. VAN LAETHEM 3,118,294
METHOD FOR MANUFACTURING KNITTED NETS AND PRODUCTS
OBTAINED THEREBY
Filed March 20, 1959 3 Sheets-Sheet 1

Adolf VAN LAETHEM
INVENTOR

By:
Wenderoth, Lind & Ponack
Attys

Jan. 21, 1964 A. VAN LAETHEM 3,118,294
METHOD FOR MANUFACTURING KNITTED NETS AND PRODUCTS
OBTAINED THEREBY
Filed March 20, 1959 3 Sheets-Sheet 2

Adolf Van Laethem
INVENTOR

BY Wenderoth, Lind & Ponack
ATTORNEYS

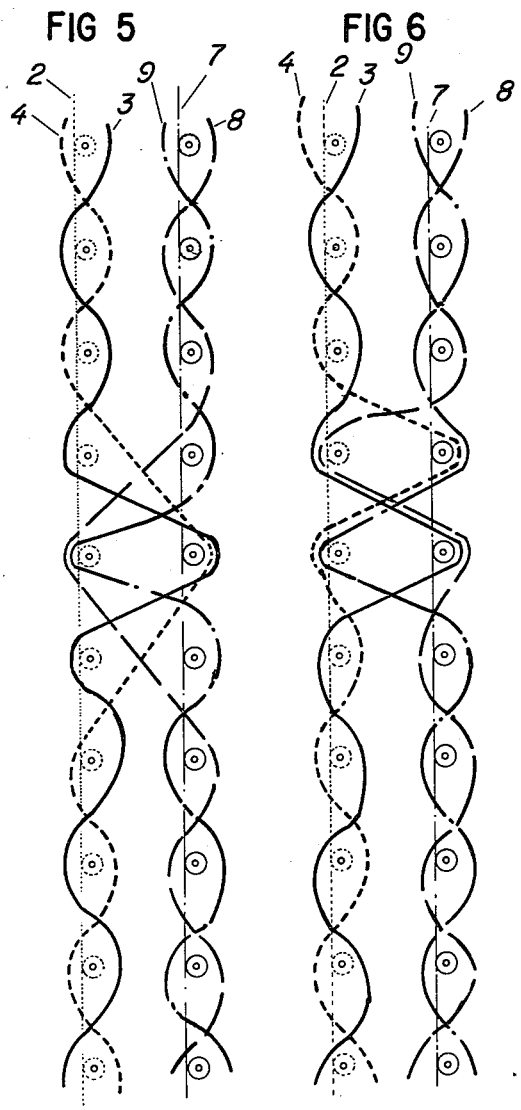

3,118,294
METHOD FOR MANUFACTURING KNITTED NETS AND PRODUCTS OBTAINED THEREBY
Adolf Van Laethem, Alost, Belgium
Filed Mar. 20, 1959, Ser. No. 800,789
Claims priority, application Netherlands Mar. 22, 1958
6 Claims. (Cl. 66—193)

This invention relates to a knitted net having meshes which can be distorted while the length of periphery thereof remains unchanging.

In the usual nets, the junctions between the meshes, often made with knots, have a tendency to slip and this drawback shows itself all the more when use is made of synthetic threads the slipping tendency of which is much more marked. The slipping of the junctions results, when an object is engaged into a mesh, in increasing the periphery of this mesh with respect to the periphery of the adjacent meshes, so that the engaged object even if the cross-section thereof gets larger, may finally escape from the net. This drawback is particularly very serious in the case of the fishing nets and of the net bags.

The presence of knots, to insure the junction between the meshes, causes on the nets protuberances where premature wear of the threads occurs. In the case of fishing nets, these protuberances are also a possible cause of damage to the fish; the presence of the knots is also, with some fishing methods, a cause of vibrations and eddies in the water.

This invention has for its object to obviate the above-mentioned drawbacks by providing a knot-free net the junctions of which are absolutely stable, while preventing the stretching of the mesh legs. For this purpose, the knitted net according to the invention comprises generally parallel longitudinal and separate chains, each chain comprising one chain-forming thread being knitted into chain stitches and two groups of inlaid threads, said inlaid threads being caught in strained condition by the loop of each stitch, in opposite directions for each one of said groups, and junctions between adjacent chains comprising stitches knitted on each chain with the chain-forming thread of the adjacent chain.

In an advantageous embodiment, junctions between adjacent chains comprise stitches knitted on each chain in loops of which are caught inlaid threads of the adjacent chain.

In another particular embodiment, junctions between adjacent chains are comprised of a plurality of successive stitches knitted on each chain, among which stitches are knitted with the chain-forming thread of the adjacent chain and in loops of some of said successive stitches are caught inlaid threads of the adjacent chain. The strength of the nets according to the invention is particularly high with respect to the weight and surface thereof.

Other details and features of the invention will stand out from the description given below by way of non limitative example and with reference to the accompanying drawings, in which:

FIGS. 2 to 6 show as point diagrams on a larger scale and for different embodiments, that part of the net surrounded by a dotted line in FIG. 1.

In the various figures, the same reference numerals pertain to similar elements or to elements having similar purposes.

Figure 1:
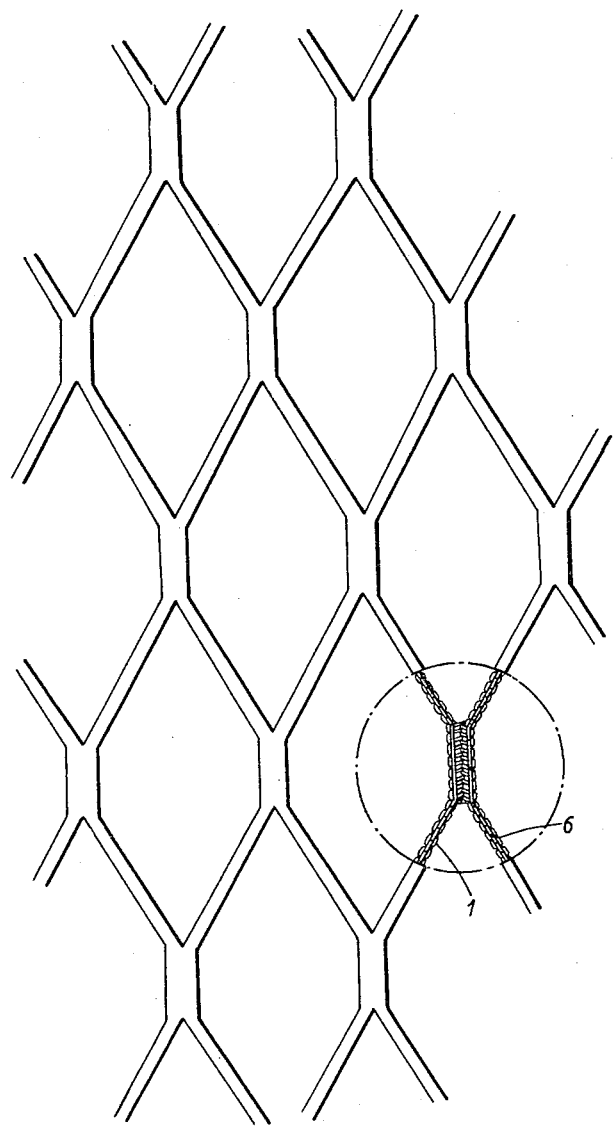
FIG. 1 is a diagrammatic view of part of a net according to the invention, that part of the figure surrounded by a dotted line being shown completely while, in the remaining part of the figure, the mesh outline is reproduced by means of lines only.

Each mesh comprises mesh sides or legs such as 1 and 6; each leg 1 is comprised of three threads or thread groups designated by 2, 3 and 4. The thread 2 forms a chain-stitch and the threads 3 and 4 are inlaid threads which are caught during knitting of the chain-stitch by the loop of each stitch such as 5 in FIG. 2, in opposite directions for each of said inlaid threads. By the expression "the threads 3 and 4 are . . . caught . . . by the loop of each stitch . . . in opposite directions for each of said . . . threads" it is meant that each of said threads 3 and 4 pass through each loop in a direction which, if reference is made to FIGURE 2, and particularly to the stitch designated by reference numeral 5, emerges from the plane of the drawing sheet for the thread 4 and penetrates into the plane of the drawing sheet for the thread 3. Each leg 6 is made up in the same way by threads 7, 8 and 9. The inlaid threads 3, 4, 8 and 9 are caught by the loops of each stitch of their respective chain-stitch in strained condition and tighten the chain stitches, as shown in FIG. 1, thus preventing the stretching of each mesh-side or leg. There results therefrom that, due to the junctions being unmovable as shown later on, each mesh has a constant length of periphery, while it can still be put out of shape. Therefore, one mesh cannot become much larger than the adjacent meshes, because the periphery thereof has increased to the detriment of the periphery of the adjacent meshes, for instance because some object has been engaged into said mesh.

At the place where the junction must be made, some elements of two adjacent legs are interwoven a number of times. The interlacings of the leg elements are repeated the number of times required according to the length to be obtained, the thread size and eventually the particular properties required from the net. At the connecting points, the number of interlacings is chosen according to the stretch required.

It is by the various ways of interlacing that the various embodiments shown in FIGURES 2 to 6 differ. It is namely to show the details of this interlacing that in FIGS. 2–6 has been shown part of a net all the threads of which have been assumed widely spread, while actually the net appears as shown in that part of FIG. 1 which is surrounded by a dotted line.

Figure 2:
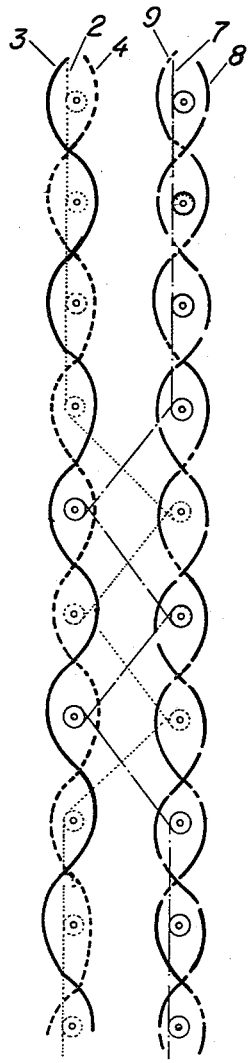

According to FIGURE 2, for the junction or connection between the legs 1 and 6, the thread 2 is placed on the needles of the thread 7 and vice-versa to knit one stitch on each chain-stitch with the chain-stitch forming thread of the adjacent chain. After knitting said stitches, the threads 2 and 7 take their places back on their respective needles. The inlaid threads 3 and 4 on the one hand and the inlaid threads 8 and 9 on the other hand are not interlaced so that where the junction is made, the inlaid threads 3 and 4 pass through the loops formed by the chain forming thread 7 when these loops lie on the needles which are normally used for forming the chain stitch made with the chain forming thread 2. In the same way, the inlaid threads 8 and 9 pass through the loops of chain forming thread 2 when this latter thread forms a stitch by means of needles which are normally used for chain forming thread 7. After knitting a new stitch with the chain forming threads 2 and 7 lying on the respective needles therefor, a second change of needles for these threads is made and after knitting a stitch these threads are brought back on their respective needles. A separate knitting of the legs then proceeds on up to the next junction which is made for each leg with the adjacent leg to form the net meshes.

Figure 3:
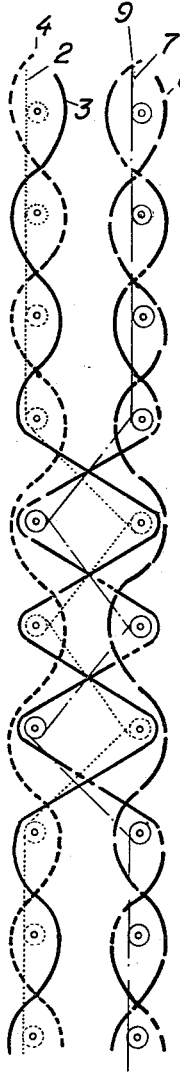

In FIG. 3, interlacing is made not only by means of chain-forming threads 2 and 7 but also by interlacing one of the two inlaid threads, that is thread 3 for leg 1 and thread 9 for leg 6; of course, the interlacing might be further complicated by interlacing not only the chain-stitch threads, but also, for each leg, the two inlaid threads.

This latter case is of course the most intricate connecting case.

Figure 4:
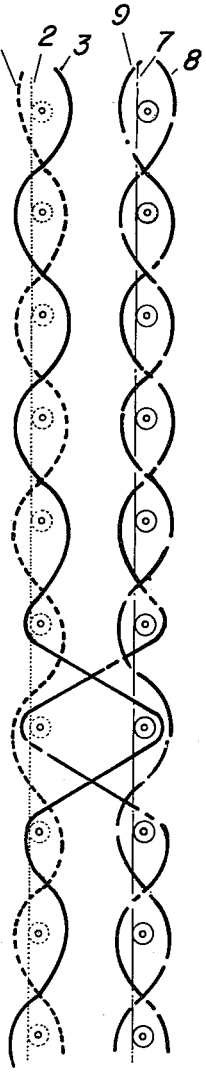

In FIG. 4, the interlacing is made very simply, as it only involves inlaid threads 3 and 9. The inlaid thread 3 interlaced in the chain stitches knitted with the chain-forming thread 2 is caught by the loops of two successive stitches of the adjacent chain knitted with the chain-forming thread 7; the inlaid thread 9 interlaced in the chain stitches knitted with the chain-forming thread 7 is caught by the loops of two successive stitches of the adjacent chain formed with the chain-forming thread 2; the inlaid thread 3 is then caught by the loops of the stitches following these two successive stitches of its original chain formed with the thread 2, and the inlaid thread 9 is caught by the loops of the stitches following these two successive stitches of its original chain formed with the thread 7, and so on up to the next junction.

In FIGS. 5 and 6, the connection is made by interlacing those two threads which do not form a chain-stitch, that is the inlaid threads, but the connections are characterised by the fact that in FIG. 5 the threads 3 and 4, on the one hand, and the threads 8 and 9, on the other hand, are simultaneously interlaced. In FIG. 6, the threads 3 and 9 are first interlaced and then, while knitting the following loop, the threads 4 and 8 are interlaced.

The inlaid threads 3 and 4 insure, in all the cases shown in FIGS. 2 to 6, the tightening of the connection, so that this latter one cannot be displaced along the mesh sides or legs.

This invention finds a particularly advantageous application in the case of fishing nets and net bags, but no kind of net is excluded.

I claim:

1. A knitted net having meshes that can be put out of shape, but having a constant length of periphery, comprising generally parallel longitudinal and separate chains, each chain comprising one chain-forming thread being knitted into chain stitches and two groups of inlaid threads, said inlaid threads being caught in strained condition by the loop of each stitch, in opposite directions for each one of said groups, and junctions between adjacent chains comprising stitches knitted on each chain with the chain-forming thread of the adjacent chain.

2. A knitted net as claimed in claim 1, in which junctions between adjacent chains are comprised of a plurality of successive stitches knitted alternatingly on said chains, the first of said stitches being knitted with the chain-forming thread of the adjacent chain, the second one being knitted with the chain-forming thread of the involved chain, the third one being knitted with the chain-forming thread of the adjacent chain.

3. A knitted net having meshes that can be put out of shape, but having a constant length of periphery, comprising generally parallel longitudinal and separate chains, each chain comprising one chain-forming thread being knitted into chain stitches and two groups of inlaid threads, said inlaid threads being caught in strained condition by the loop of each stitch, in opposite directions for each one of said groups, and junctions between adjacent chains comprising stitches knitted on each chain in loops of which are caught inlaid threads of the adjacent chain.

4. A knitted net as claimed in claim 3, in which junctions between adjacent chains are comprised of a plurality of successive stitches knitted on each chain with the chain-forming thread of the involved chain, the inlaid threads of the adjacent chain being caught in opposite directions by the loops of the first and second of these successive stitches, the inlaid threads of the involved chain being caught in opposite directions by the loops of the third and fourth stitches of these successive stitches, the inlaid threads of the adjacent chain being caught in opposite directions by the loops of the fifth and sixth stitches of these successive stitches.

5. A knitted net having meshes that can be put out of shape, but having a constant length of periphery, comprising generally parallel longitudinal and separate chains, each chain comprising one chain-forming thread being knitted into chain stitches and two groups of inlaid threads, said inlaid threads being caught in strained condition by the loop of each stitch, in opposite directions for each one of said groups, and junctions between adjacent chains are comprised of a plurality of successive stitches knitted on each chain, among which stitches are knitted with the chain-forming thread of the adjacent chain and in loops of some of said successive stitches are caught inlaid threads of the adjacent chain.

6. A knitted net as claimed in claim 5, in which junctions between adjacent chains are comprised of a plurality of successive stitches knitted on each chain, the first of said stitches being knitted with the chain-forming thread of the adjacent chain, the second one being knitted with the chain-forming thread of the involved chain, the third one being knitted with the chain-forming thread of the adjacent chain, and so on, the inlaid threads of the adjacent chain being caught in opposite directions by the loops of the first and second of these successive stitches, the inlaid threads of the involved chain being caught in opposite directions by the loops of the third and fourth stitches of these successive stitches, the inlaid threads of the adjacent chain being caught, in opposite directions by the loops of the fifth and sixth stitches of these successive stitches.

References Cited in the file of this patent

UNITED STATES PATENTS

| | | |
|---|---|---|
| 220,967 | Duboc | Oct. 28, 1879 |
| 550,304 | Ward | Nov. 26, 1895 |
| 1,050,120 | Friedberger | Jan. 14, 1913 |
| 1,139,342 | Clewley | May 11, 1915 |
| 1,185,933 | Powell | June 6, 1916 |
| 1,186,507 | Branson | June 6, 1916 |
| 1,187,158 | McGinley | June 13, 1916 |
| 1,201,803 | Chace | Oct. 17, 1916 |
| 1,715,482 | Vorck | June 4, 1929 |
| 1,869,304 | Decker et al. | July 26, 1932 |
| 2,104,538 | Goldsmith | Jan. 4, 1938 |
| 2,149,031 | Schonfeld | Feb. 28, 1939 |
| 2,190,560 | Gaines | Feb. 13, 1940 |
| 2,213,720 | Seim | Sept. 3, 1940 |
| 2,249,342 | Aull | July 15, 1941 |
| 2,289,302 | Bradshaw | July 7, 1942 |
| 2,403,793 | Feinstein | July 9, 1946 |
| 2,411,175 | Wagler | Nov. 19, 1946 |
| 2,667,775 | Aibel | Feb. 2, 1954 |

OTHER REFERENCES

"Warp Knitting Technology" (Paling), published by Harlequin Press (London), 1952.